United States Patent
Chen et al.

(10) Patent No.: US 7,671,796 B2
(45) Date of Patent: Mar. 2, 2010

(54) SATELLITE SEARCH METHOD

(75) Inventors: Kun-tso Chen, Chang-Hua Hsien (TW); Kung-shuan Huang, Changhua County (TW); Jan-shin Ho, Yilan County (TW)

(73) Assignee: Mediatek Inc., Hsin-Chu (TW)

( * ) Notice: Subject to any disclaimer, the term of this patent is extended or adjusted under 35 U.S.C. 154(b) by 172 days.

(21) Appl. No.: 11/566,009

(22) Filed: Dec. 1, 2006

(65) Prior Publication Data
US 2007/0229352 A1 Oct. 4, 2007

Related U.S. Application Data

(63) Continuation-in-part of application No. 11/392,976, filed on Mar. 28, 2006.

(60) Provisional application No. 60/802,757, filed on May 23, 2006.

(51) Int. Cl.
*G01S 1/00* (2006.01)
*G01S 3/02* (2006.01)

(52) U.S. Cl. .................... 342/357.15; 342/457

(58) Field of Classification Search ............ 342/357.15, 342/457
See application file for complete search history.

(56) References Cited

U.S. PATENT DOCUMENTS

| | | | |
|---|---|---|---|
| 5,402,347 A | 3/1995 | McBurney et al. | |
| 5,418,538 A | 5/1995 | Lau | |
| 5,535,237 A * | 7/1996 | LaPadula et al. | 375/130 |
| 5,600,670 A | 2/1997 | Turney | |
| 5,663,735 A | 9/1997 | Eshenbach | |
| 5,798,732 A | 8/1998 | Eshenbach | |
| 5,854,605 A | 12/1998 | Gildea | |
| 5,917,444 A | 6/1999 | Loomis et al. | |
| 6,191,731 B1 | 2/2001 | McBurney et al. | |
| 6,211,817 B1 | 4/2001 | Eschenbach | |
| 6,225,945 B1 | 5/2001 | Loomis | |
| 6,273,429 B1 | 8/2001 | Dudinetz et al. | |
| 6,275,185 B1 | 8/2001 | Loomis | |
| 6,400,319 B1 * | 6/2002 | Castelloe et al. | 342/457 |
| 6,459,405 B1 | 10/2002 | Da et al. | |
| 6,559,793 B1 | 5/2003 | Eschenbach | |
| 6,597,988 B1 * | 7/2003 | Brodie et al. | 701/213 |
| 6,671,620 B1 * | 12/2003 | Garin et al. | 701/213 |
| 6,778,136 B2 | 8/2004 | Gronemeyer | |
| 2003/0079173 A1 * | 4/2003 | Birru | 714/792 |

(Continued)

OTHER PUBLICATIONS

U.S. Appl. No. 11/392,976, titled "Cold Start Satellite Search Method," filed Mar. 28, 2006, with inventor(s) Kun-Iso Chen and Kung-shuan Huang.

*Primary Examiner*—Thomas H Tarcza
*Assistant Examiner*—Harry Liu

(57) ABSTRACT

A method for searching satellites is disclosed. In the method of the present invention, the satellites are selected to consist of a group, and searching is conducted in this group. The group size is predetermined for each stage so as to be the most appropriate for various searching conditions. The member number of the group (i.e. group size) and the members of the group are updated as the searching results are continually obtained. The updates are done according to scanning times of the group, satellite hit number, searching time for the group and satellite priorities and the like, for example. The group size can be reduced or expanded. By using the method, satellites required to fix a position can be rapidly found.

22 Claims, 5 Drawing Sheets

U.S. PATENT DOCUMENTS

2004/0183724 A1* 9/2004 Sheynblat .............. 342/357.15
2006/0077096 A1* 4/2006 King et al. ............. 342/357.15
2006/0152409 A1   7/2006 Raman et al.
2006/0181452 A1* 8/2006 King et al. ............. 342/357.02
2006/0250304 A1  11/2006 Mo et al.

* cited by examiner

SATELLITE SEARCH METHOD

CROSS-REFERENCES TO RELATED APPLICATIONS

The present application is a continuation-in-part of U.S. patent application Ser. No. 11/392,976, entitled "COLD START SATELLITE SEARCH METHOD", filed on Mar. 28, 2006. In addition, the present application claims the priority of the Provisional Application Ser. No. 60/802,757, entitled "SATELLITE GROUP SEARCH METHODS FOR IMPROVING TIME TO FIRST FIX", filed on May, 23, 2006.

TECHNICAL FIELD OF THE INVENTION

The present application relates to satellite communication, more particularly, to a satellite search method, which is capable of improving time-to-first-fix (TTFF).

BACKGROUND OF THE INVENTION

Satellite positioning has been widely used in various applications. In satellite communication systems such as Global Navigation Satellite System (GNSS), a cold start state means that no information such as the receiver position, observation time, satellite orbit information (e.g. almanac or ephemeris) are available. Accordingly, the identification (ID) of a visible satellite is of course unknown. In addition to the satellite ID, the Doppler frequency due to the satellite motion with respect to the user is unknown. If a Code Division Multiple Access (CDMA) signaling is used in the system, Global Positioning System (GPS) for example, the code phase of the Pseudo Random Noise (PRN) code used by a satellite is also required to track that satellite. As mentioned, the characteristic of a satellite signal can be determined by the following variables: satellite ID, Doppler frequency and PRN code phase.

At least four satellites are required to fix a three dimensional position. The required time-to-first-fix (TTFF) depends on how fast the four visible satellites can be found. For example, there may be as many as twelve GPS satellites that are visibly observed from the surface of the earth. Conventionally, all of the possible satellites are searched sequentially in order to find the visible satellites. Moreover, the Doppler frequency and PRN code phase of each satellite are also unknown. Therefore, it takes a lot of time to try all the possible values to determine a satellite's existence.

In general, a receiver searches for a visible satellite by using correlation analysis which considers satellite ID (e.g. satellites of the system GPS, Galileo, WAAS, EGNOS, MSAS etc.), code phase, and Doppler frequency. In addition, serial and parallel searches might be used. For example, four different satellites can be searched at the same time if there are four available channels. To search a satellite, all the possible code phases and Doppler frequencies thereof should be scanned.

A numerical example will be described hereinafter. Assuming that a visible GPS satellite list is {5, 9, 14, 15, 18, 21, 22, 26, 29, 30} for a receiver, which can use one physical channel and ten channels to search and track satellites, respectively. Scanning time, $T_s$, is defined as the time required to scan the whole range of possible Doppler frequencies and code phases. If a candidate satellite is not visible, a correlator dismisses it after searching time $T_s$. On the other hand, the correlator hits a visible satellite after searching time $\frac{1}{2} T_s$ on average. Further, it is assumed that the data demodulation bit error rate is zero. Therefore, it takes 750 sec to receive almanac after the hit of the first satellite. After the hit of one satellite, it takes 27.6 sec on average to receive its ephemeris. The scanning time, $T_s$, can be computed for a receiver that tracks GPS L1 C/A code signal, which has 1023 chips per code period. If the code resolution of code correlation in acquisition process is ½ chip, the code phase uncertainty range size is 2046. In general, a combination of coherent and incoherent integration is used in the receiver to increase the acquisition sensitivity. Therefore, the correlation period (denoted by $\Delta T$) for one particular pair of Doppler frequency and code phase candidates is the coherent time (denoted by Tc) multiplied by the incoherent count (denoted by Ti). Moreover, the Doppler frequency resolution, dF, is set to be 1/Tc in general. Finally, the whole Doppler range is denoted by AF. Based on the above assumptions, the scanning time Ts can be computed as follows.

$$T_s = 2046 \times \frac{\Delta F}{dF} \times \Delta T \quad (1)$$
$$= 2046 \times \frac{\Delta F}{1/T_C} \times (T_i \times T_C)$$
$$= 2046 \times \Delta F \times T_i \times T_C^2$$

If the receivers uses Tc of 1 ms to perform coherent integration and no incoherent integration is used, i.e., Ti equals one, then the required scanning time Ts is 20.46 seconds to scan the Doppler range size equal to 10 kHz. Four satellites must be found to make the first position fix. Assuming that the satellite search order is 1, 2, ..., 32 for a sequential search of GPS satellites, then satellites 5, 9, 14 and 15 in the visible satellite list should be hit in order. Table 1 shows the results of sequential search.

TABLE 1

Hit results of sequential search

| | SV ID | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| Epoch (Ts) | 1 | 2 | 3 | 4 | 4.5 | 5.5 | 6.5 | 7.5 | 8 | 9 | 10 | 11 | 12 | 12.5 | 13 | 14 |
| Hit | 0 | 0 | 0 | 0 | 1 | 0 | 0 | 0 | 2 | 0 | 0 | 0 | 0 | 3 | 4 | 0 |

| | SV ID | | | | | | | | | | | | | |
|---|---|---|---|---|---|---|---|---|---|---|---|---|---|---|
| | 17 | 18 | 19 | 20 | 21 | 22 | 23 | 24 | 25 | 26 | 27 | 28 | 29 | 30 |
| Epoch (Ts) | 15 | 15.5 | 16.5 | 17.5 | 18 | 18.5 | 19.5 | 20.5 | 21.5 | 22 | 23 | 24 | 24.5 | 25 |
| Hit | 0 | 5 | 0 | 0 | 6 | 7 | 0 | 0 | 0 | 8 | 0 | 0 | 9 | 10 |

The visibilities of+ the respective satellites can be obtained from observation statistics results at various time sampling points for a fixed position. FIG. 1 shows an example of observation time sampling points at a certain position. For instances, at observation time sampling point "8" of the diagram, the visible satellites are SV5, 9, 14, 15, 18, 21, 22, 26, 29 and 30.

As can be seen from Table 1, the sequential searching scheme takes 4.5 Ts (=110.07 sec) to achieve the first hit (Satellite 5 is hit), and about 13 Ts+27.6=345.58 sec to achieve the first fix (Satellites 5, 9, 14 and 15 are hit and 27.6 sec are required to collect the ephemeris of satellite 15.) To find all satellites on the visible satellite list, 25 Ts (611.5 sec) is required. These periods of hit time are undesirably long. Accordingly, there is a need for a solution to reduce the time required to find the visible satellites.

SUMMARY OF THE INVENTION

The present invention is to provide a satellite search method, by which satellites required to fix a position can be rapidly found.

In accordance with the present invention, the satellites are selected to consist of a group, and searching is conducted in this group. The group size is predetermined for each stage so as to be the most appropriate for various searching conditions. The member number of the group (i.e. group size) and the members of the group are updated as the searching results are continually obtained. The updates are done according to scanning times of the group, satellite hit number, searching time for the group and satellite priorities and the like, for example. The group size can be reduced or expanded.

DETAILED DESCRIPTION OF THE INVENTION

Details of the present invention will be described as follows.

Figure 1:
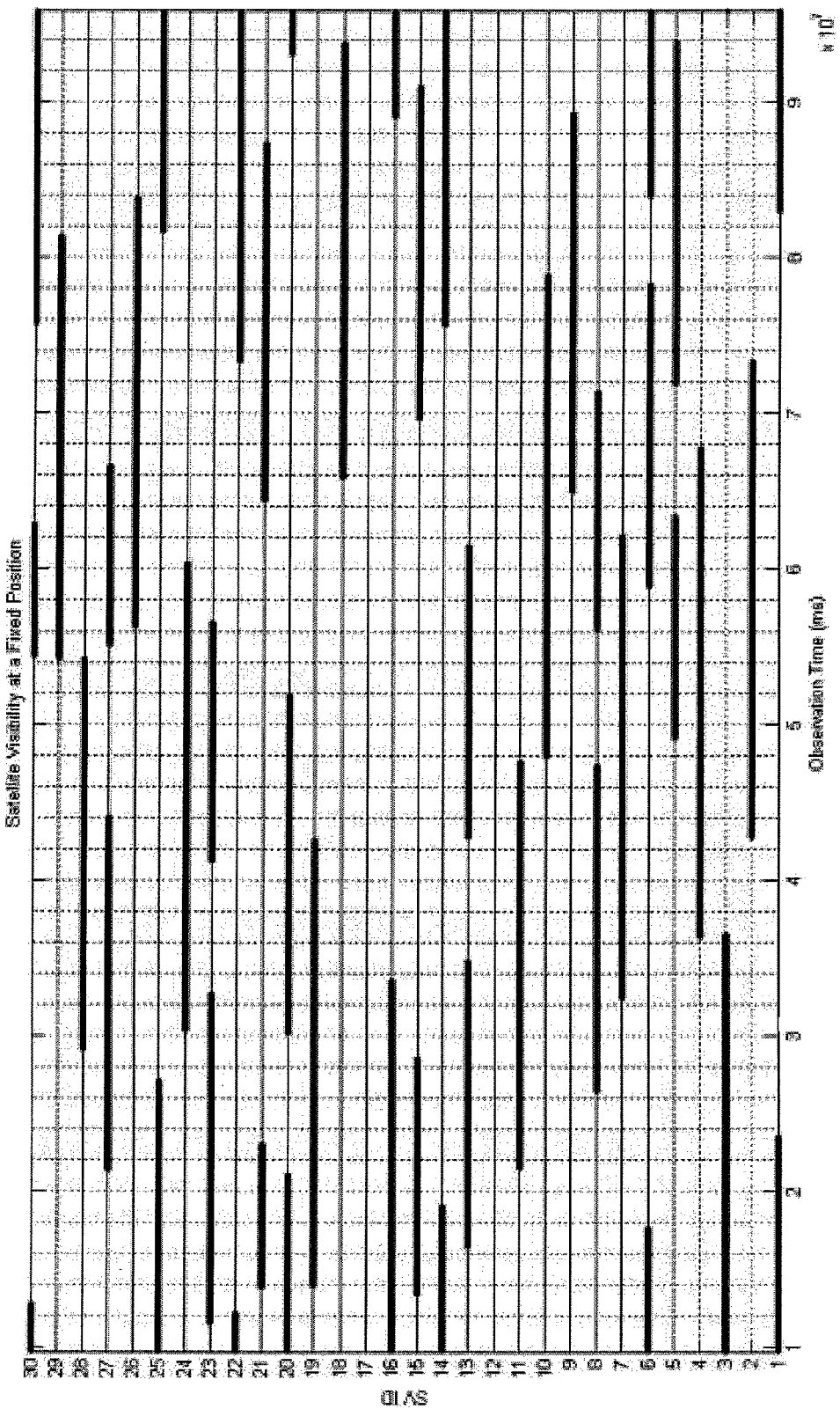
FIG. 1 shows an example of satellite visibility observation results at time sampling points for a fixed position.
Figures 1, 2:
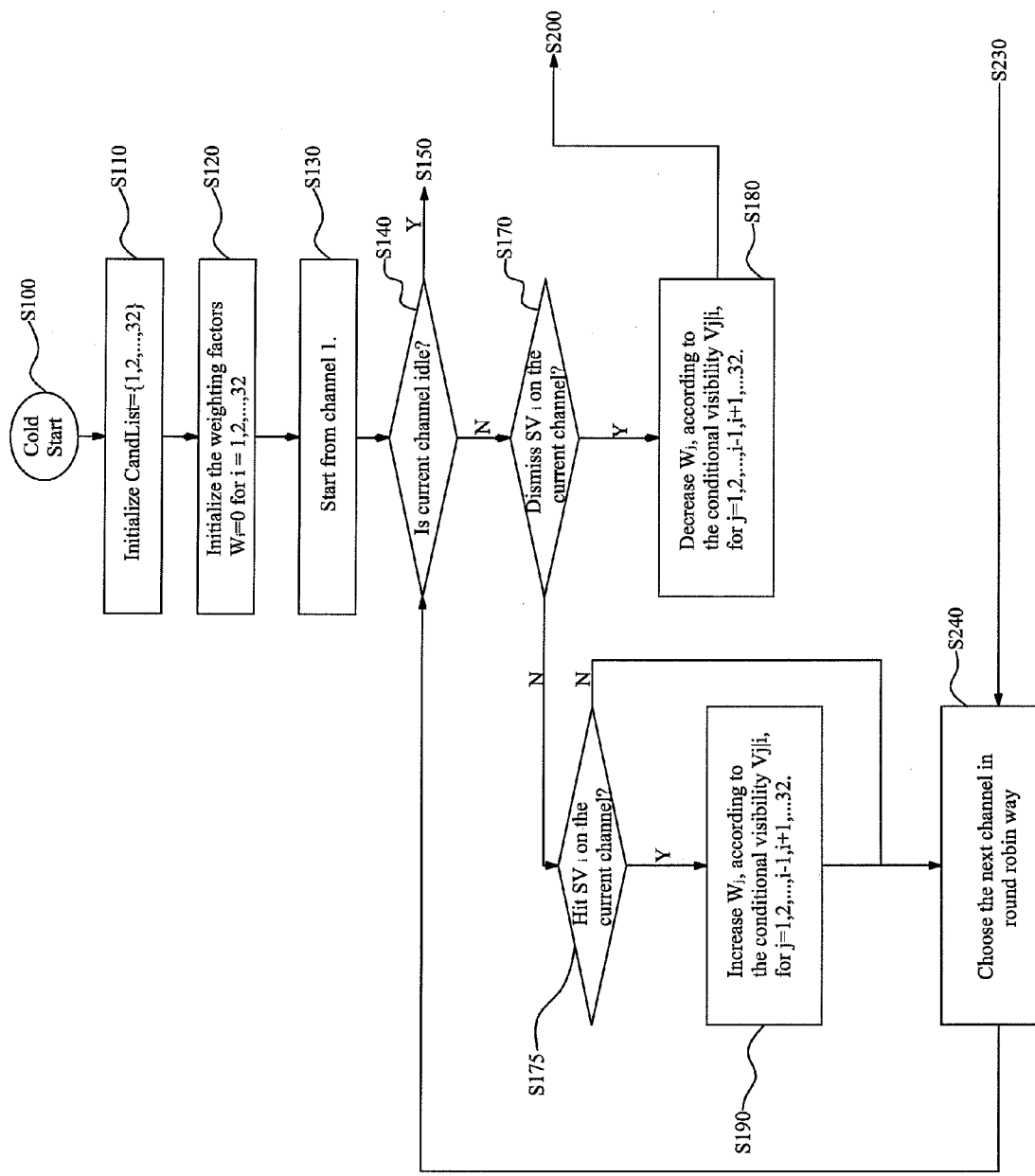
FIG. 2 is a flow chart showing a satellite search method.
Figure 2:
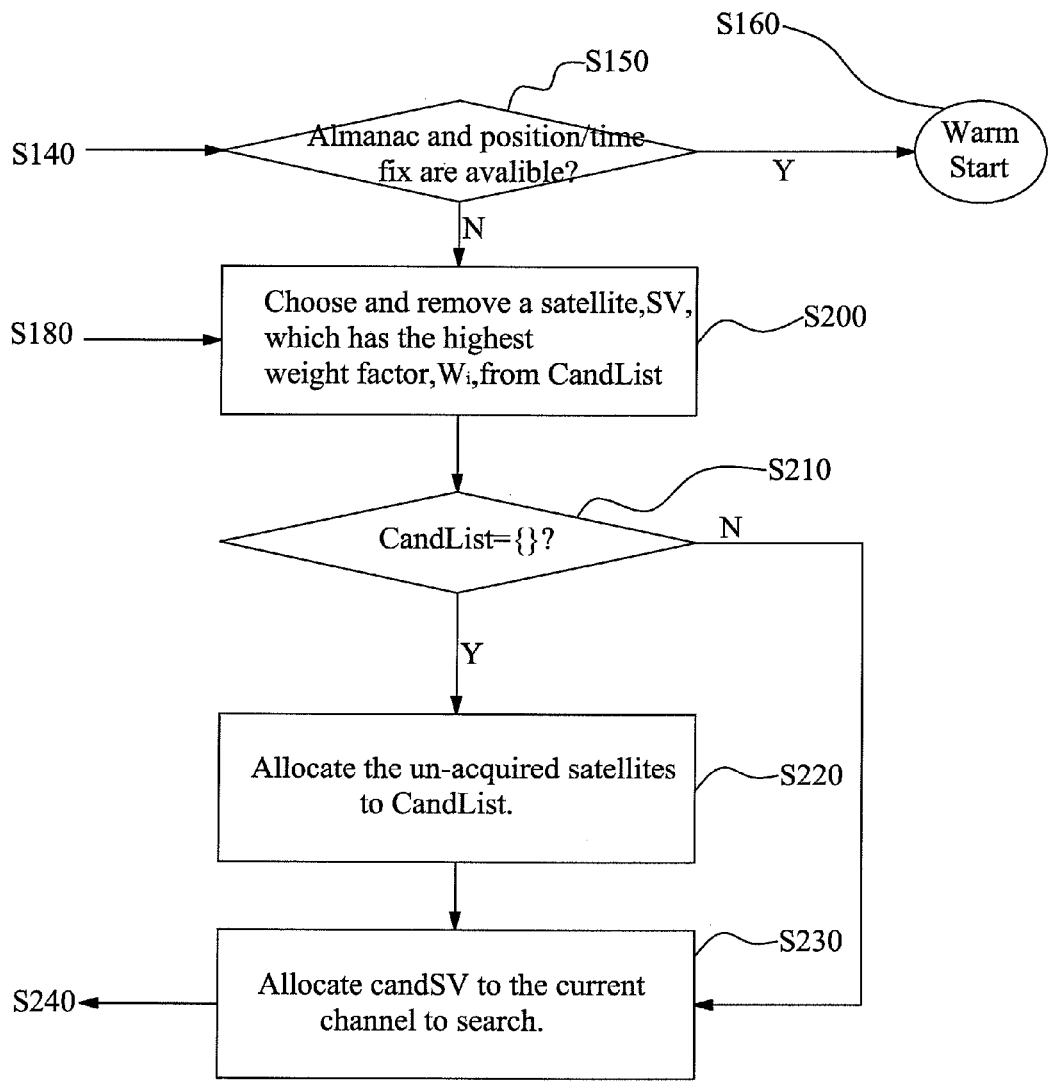

The satellite searching method of U.S. patent application Ser. No. 11/392,976 is shown in FIG. 2. The method is started with a cold start state (step S100). In step S110, a candidate satellite list, CandList, including all possible satellites, is initialized as {1, 2, . . . , 32} to search GPS satellites, for example. In step S120, a weight factor table recording weight factors for the satellites of the list is initialized. The weight factors of all the satellites are set to be 0, i.e. $W_i=0$ for i=1, 2, . . . , 32. In general, there are several physical channels in a receiver, which can search and track satellites. Each physical channel is checked and controlled in a round robin way with the first channel assigned in step S130. In step S140, it is to determine if the current channel is idle, i.e., it is not searching or tracking a satellite. If the current channel is idle, it is determined whether the almanac and position/time fix information are available or not in step S150. If the information is available, the process is switched to warm start state (Step S160) and determine the satellite candidate according to the available information. Otherwise, the process will enter the process. In step S200, it chooses and removes a satellite ID from CandList, which has the highest weight factor. In the initial state, the first satellite can be selected randomly or as desired. A round-robin scheduling is used to search satellite. That is, all the satellites are searched only once in one round. Therefore, we check the list CandList in step S210. The list CandList consists of the remaining satellites to search in the current round. If it is empty, the current round ends and the next round starts to search the un-acquired satellites. Therefore, we reassign satellite candidates in step S220. In step S230, the current idle channel is assigned to search the chosen satellite candidate. In step S240, the next physical channel is chosen. In step S150, if the current channel is not idle, it means that it is searching a satellite. Then we check the search result of the satellite, dismiss or hit, in Step S170 and S175, respectively. If the channel does not finish its searching, we will enter step S240 and choose the next channel. After a channel finishes its search for a satellite, the searching result whether the satellite is hit or dismissed will be issued. If the satellite is dismissed, we decrease the weight factors of the other satellites by amounts determined by the conditional visibilities in step S180. Alternatively, the weight factors of all the satellites including the searched one are updated. Then the current channel can be used to search the next satellite and the process enters step S200 to choose another satellite to search. It is noted that the weight factors are updated in step S180 so that we can choose a satellite which has the highest weight factor or is equivalently most probable to be observed from CandList.

If the process finds that the current channel hits a satellite in step S190, the process will increase the weight factors of the satellites according to their conditional visibilities with respect to the hit one. In one embodiment, the weight factor of the hit satellite per se is not updated. In another embodiment, the weight factor of the hit satellite is also updated. The current channel will be used to track the hit satellite and so the process goes to step S240 directly to process the next channel.

In the above descriptions, the satellite member with the highest priority is searched and in the meanwhile is removed from the CandList. The satellite priorities are described as follows. The satellite searching is started with searching for a predetermined or randomly selected first satellite from the list of candidate satellites including all or a predetermined part of the available satellites. An initial weight factor table is previously prepared. The initial weight factors are then updated whenever a satellite is searched. The weight factors are used to determine which satellite has the highest probability indicating that it is visible. For example, if the candidate satellite list includes satellites SV1, SV2, . . . , SV32, and the searched satellite is satellite SV1, then the updated weight factors of satellites SV2 to SV32 are used to choose the next satellite to search. The weight factors can be updated according to any desired interrelationships between two satellites. The weight factors are updated according to conditional visibilities, that is, the conditional probabilities that a satellite is visible if a specific satellite is visible. An example of the conditional visibilities for satellite SV1 is shown in Table 2. The rest can be deduced in the same way.

TABLE 2

Conditional visibilities for SV 1

| | $SV_i$ | | | | | | | | | | | | | | | |
|---|---|---|---|---|---|---|---|---|---|---|---|---|---|---|---|---|
| | 1 | 14 | 25 | 20 | 11 | 16 | 22 | 3 | 30 | 19 | 23 | 15 | 6 | 5 | 24 | 18 |
| $V_{i|1}$ | 1 | 0.59 | 0.56 | 0.17 | 0.06 | 0.05 | 0.04 | 0.04 | 0 | −0.04 | −0.05 | −0.16 | −0.17 | −0.19 | −0.25 | −0.33 |

| | $SV_i$ | | | | | | | | | | | | | | | |
|---|---|---|---|---|---|---|---|---|---|---|---|---|---|---|---|---|
| | 9 | 21 | 13 | 4 | 7 | 2 | 28 | 27 | 8 | 10 | 26 | 29 | 12 | 17 | 31 | 32 |
| $V_{i|1}$ | −0.34 | −0.36 | −0.47 | −0.51 | −0.53 | −0.64 | −0.65 | −0.68 | −0.90 | −0.92 | −0.94 | −1 | −1 | −1 | −1 | −1 |

Initial weight factors $W_i$ for i=1, 2, . . . , 32 in the weight factor table are all set to be 0. Whenever a satellite, SVi for example, is searched and determined to be visible or not, the weight factors $W_j$ for j=1, 2, . . . , i−1, i+1, . . . , 32 are updated based on the respective conditional visibilities $V_{j|i}$.

The first satellite to be searched can be predetermined as satellite SV1. However, it can be any one of the possible satellites. The first satellite to be searched can also be selected randomly. After the first satellite is searched, the initial weight factor table is updated according to the searching result of this satellite, SV1 in this embodiment. If the satellite SV1 is hit, the weight factors of the other satellites SV2 to SV32 are increased according to their conditional visibilities with respect to SV1. That is, $W_j = W_j + V_{j|1}$ for j=2, 3, . . . , 32. On the other hand, the weight factors are decreased if the satellite SV1 is dismissed. That is, $W_j = W_j − V_{j|1}$ for j=2, 3, . . . , 32. Then, a second satellite to be searched is selected according to the updated weight factor table. For example, a satellite with the highest weight factor is selected to search. The sequent satellites to be searched are selected similarly.

In the present invention, the members of the satellite ID list (i.e. the CandList) to be searched is more effectively controlled and reduced dynamically, so that correlators of the receiver are used to search a group of satellites which are most probably visible. In weak signal situation, dwell time of a satellite search is huge in order to increase acquisition sensitivity. Under such a condition, it is possible to reduce TTFF if all of the correlators of the receiver are used to search the group of satellites which are most probably visible, since the receiver does not spend a lot of time on searching invisible satellites.

Preferably, the group members of the candidate list are changed dynamically and the group size converges to a list of truly visible satellites so as to reduce the searching range for the receiver. However, the group can be also expanded to search more un-acquired satellite when most members of the current group have been acquired and tracked or when the members of the current group have been searched for many times but the required almanac and ephemeris information have not been obtained, for example.

Figure 3:
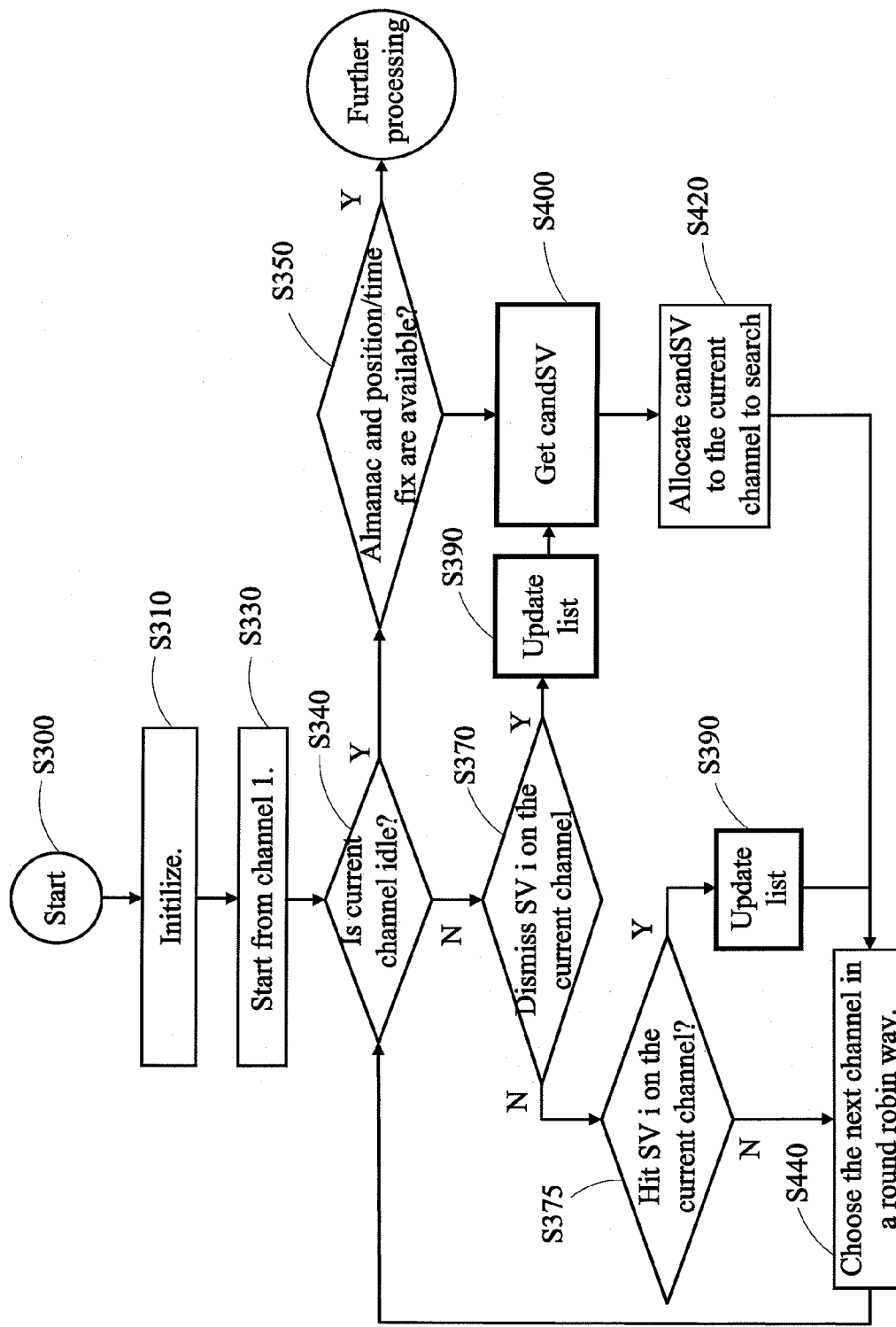
FIG. 3 is a flow chart showing a satellite search method of an embodiment in accordance with the present invention.

FIG. 3 is a flow chart showing main steps of the satellite group search method in accordance with the present invention. The method is started at step S300. In step S310, a candidate satellite list, CandList, is initialized as {1, 2, . . . , 32} to search GPS satellites, for example. Each physical channel is checked and controlled in a round robin way with the first channel assigned in step S330. In step S340, it is to determine if the current channel is idle, i.e., it is not searching or tracking a satellite. If the current channel is idle, it is determined whether the almanac and position/time fix information are available or not in step S350. If the required satellite information is available, the process is switched to further processing, which is not the issue to be discussed in the present invention, and therefore the descriptions thereof are omitted. Otherwise, the process will enter step S400, which will be described later. If the current channel is being used, that is, the current channel is conducting searching. Then, in steps S370 and S375, it is determined that a satellite SVi is dismissed or hit. Whatever the search result is, the candidate list is updated accordingly (step S390). For example, the group initially including 32 satellites is updated to have only 8 satellites. This will be further described later. In step S400, which can be referred to as a "Get CandSV" sub-process, a candidate satellite is selected from the current list. The list, CandList, consists of all the possible satellites (i.e. satellite candidates). In the present embodiment, the satellites are sorted according to the priorities thereof. The priorities are determined based on the weight factors mentioned above. The satellite of the highest priority is selected and is removed from the current searching list rather than the group. That is, the current group is scanned by means of a round robin scheme for one scan. If the selected satellite has been already tracked or is being searched, the "Get CandSV" sub-process is repeated. The times that the group is scanned is indicated by a count "round", which is used to determine the size of the updated group, details later. In step S420, the satellite selected from the group is allocated to the current channel to be searched. In step S440, the next physical channel is chosen.

Figure 4:
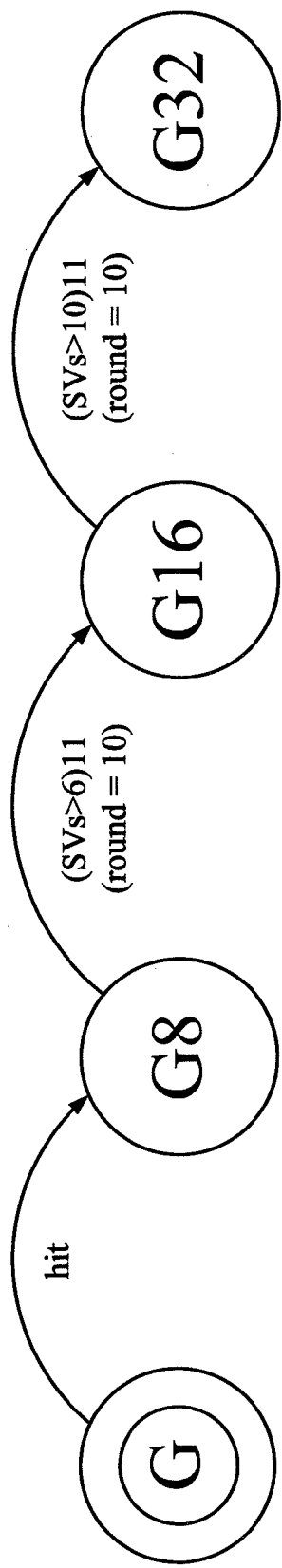
FIG. 4 is a schematic illustration showing an example of updates for group size of the candidate satellite list in accordance with the present invention.

FIG. 4 schematically shows an example of updates for the group size of the candidate satellite list according to the present invention. As shown, the initial group size (i.e. the member number of group) of the list is 32 (i.e. G32), that is, all of the available 32 satellite IDs are included in the list, for example. After the first search (or preferably, the first hit), the group size is changed to 8 in this example. At the stage that group size=8 (i.e. G8), if the hit number reaches 6 (i.e. there are 6 satellites have been found), or if the current group has been scanned over 10 times (i.e. round=10), then the group size is expanded to 16. At the stage that group size=16 (i.e. G16), if the hit number reaches 10 (i.e. there are 10 satellites have been found), or if the current group has been scanned over 10 times (i.e. round=10), then the group size is expanded to 32. Although G32, G8 and G16 are described in this example, the group size at each stage can be set as desired. In addition, the conditions that the group size should be changed from the current size to an updated size can be modified or added as desired.

In the embodiment shown in FIG. 4, the group size can be expanded dynamically. But in another embodiments, the group size can be reduced or expanded dynamically depending on the conditions and design settings. Various parameters can be taken into account. For example, if the number of satellites which have been tracked reaches a predetermined value, the group size is expanded. If the group scanning times (i.e. round) reaches a predetermined number, the group size is expanded. If the number of tracked satellites is below a threshold, the group size is reduced. Any other possible conditions can also be brought into the design considerations. For example, if the searching time exceeds a threshold, the group size is changed.

In one embodiment, when the group is updated from the initial group of 32 members to the group of 8 members, the 8 satellites with the highest priorities among the 32 satellites can be selected as the 8 members. The priorities can be determined by the weight factors described above. As mentioned, the change from 32 members to 8 members can be executed after a first satellite is searched. That is, after a first satellite is searched, no matter it is hit or dismissed, the priorities of all the satellites can be updated based on the searching result, and the 8 members are selected according to the satellite priorities. Alternatively and preferably, the change from the initial 32 members to 8 members is executed after the first hit. That is, the change is done only when a first satellite is found. This is to avoid the effect of signal blocking or wrong detection.

During each stage (e.g. G8, G16 or G32), the members of the group can be constant until the group size is changed. For example, during the stage of G8, the 8 members are not changed. When the stage is updated from G8 to G16, the 16 satellites with the highest priorities among all the available satellites are selected as the 16 members of the group G16. In another embodiment, during each stage, the members are variable. For example, during the G8 stage, the eight members of this group are not fixed but updated according to the searching results. The eight members are selected according to the satellite priorities described above. The satellite priorities can be updated whenever a satellite is searched. Alternatively, the satellite priorities are updated only when a satellite is hit. Furthermore, in addition to the conditional visibilities used to determine the priorities as mentioned above, estimated CNR (carrier-to-noise ratio) of signals received from the satellites can also be used with the conditional visibilities to commonly determine the satellite priorities. This is to avoid the effect of detection false alarm.

In the case that the group members for a specific group are variable, the members of the group can be updated whenever the satellite priorities are updated. However, the members can also be updated after the satellite priorities have been subjected to several updates instead of only one update. Since the probability of false detection or blocking for several satellites is less than that for only one satellite, the satellite priorities can be more correct and reliable by doing so.

The settings for change of the group size and the update of the group members are very flexible in accordance with the present invention. In addition to the conditions mentioned above, any other possible condition can be taken into account.

Although the GPS system and satellites the above embodiments, other GNSS (Global Navigation Satellite System) systems such as GLONASS, GALILEO system and the like are also applicable. In addition, the present invention can also utilized in SBAS (Satellite Based Augmentation Systems), which include MSAS, EGNOS, WAAS and so on. The method in accordance with the present invention can be used in any other proper type of communication system.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A method for a receiver to search satellites in a satellite communication system, said method comprising steps of:
   searching for a satellite from a group of satellite, the group including a predetermined first member number of satellites;
   determining whether to change the first member number depending on a condition of the search step; and
   changing the first member number to a predetermined second member number if it is determined to change the first member number in the determining step, the second member number being different from the first member number.

2. The method of claim 1, wherein the first member number is determined to be changed to the second member number when a satellite has been searched to determine said satellite is hit or dismissed.

3. The method of claim 1, wherein the first member number is determined to be changed to the second member number when a predetermined number of satellites have been searched to determine said satellites are hit or dismissed.

4. The method of claim 1, wherein the first member number is determined to be changed to the second member number when the group has been scanned over a predetermined number of times.

5. The method of claim 1, wherein the second member number is less than the first member number.

6. The method of claim 1, wherein the first member number is greater than the first member number.

7. The method of claim 1, wherein the first member number is determined to be changed to the second member number when the time of searching exceeds a threshold.

8. The method of claim 1, further comprising a step of updating satellites of the group.

9. The method of claim 1, wherein the communication system is a GNSS system.

10. The method of claim 1, wherein the communication system is a SBAS system.

11. The method of claim 1, further comprising:
    predetermining a plurality of member numbers,
    wherein the first member number is selected from the set member numbers and the second member number is also selected from the set member numbers.

12. The method of claim 8, wherein the satellites of the group are updated when the first member number is changed to the second member number.

13. The method of claim 12, wherein the satellites are selected to be included in the group according to satellite priorities.

14. The method of claim 12, wherein the satellites are selected to be included in the group according to satellite priorities of all available satellites, and the satellite priorities are determined based on the searching result of said satellite.

15. The method of claim 13, wherein the satellite priorities are determined based on conditional visibilities.

16. The method of claim 15, wherein the satellite priorities are determined further based on carrier-to-noise ratios of signals received from the satellites.

17. The method of claim 8, wherein the satellites of the group are updated whenever a predetermined number of satellites have been searched to determine said satellites are hit or dismissed.

18. The method of claim 17, wherein the satellites are selected to be included in the group according to the satellites priorities of all available satellites, and the satellite priorities are determined based on searching results of said satellites.

19. The method of claim 17, wherein the satellites are selected to be included in the group according to satellite priorities of all available satellites, and the satellite priorities are determined based on each hit of said satellites.

20. The method of claim 17, wherein the satellites are selected to be included in the group according to satellite priorities of all available satellites, and the satellite priorities are determined based on each dismiss of said satellites.

21. The method of claim 17, wherein the satellites are selected to be included in the group according to the satellites priorities of all available satellites, and the satellite priorities are determined based on hits of said satellites.

22. The method of claim 17, wherein the satellites are selected to be included in the group according to the satellites priorities of all available satellites, and the satellite priorities are determined based on dismisses of said satellites.

* * * * *